US011425605B1

(12) United States Patent
Cheng

(10) Patent No.: US 11,425,605 B1
(45) Date of Patent: Aug. 23, 2022

(54) AUTOMATIC LINK ESTABLISHMENT SYSTEM AND METHOD FOR ASYMMETRIC LINK

(71) Applicant: Rockwell Collins, Inc., Cedar Rapids, IA (US)

(72) Inventor: Ho Ting Cheng, Stittsville (CA)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/139,100

(22) Filed: Dec. 31, 2020

(51) Int. Cl.
*H04W 28/16* (2009.01)
*H04W 72/04* (2009.01)
*H04W 76/40* (2018.01)

(52) U.S. Cl.
CPC ......... *H04W 28/16* (2013.01); *H04W 72/048* (2013.01); *H04W 72/0453* (2013.01); *H04W 76/40* (2018.02)

(58) Field of Classification Search
CPC ............. H04W 28/16; H04W 72/0453; H04W 72/048; H04W 76/40
See application file for complete search history.

(56) References Cited

U.S. PATENT DOCUMENTS

| 7,486,697 | B2 | 2/2009 | Fernandes et al. |
| 8,401,017 | B2 | 3/2013 | Wang et al. |
| 10,084,656 | B2 | 9/2018 | Zhan et al. |
| 2017/0126501 | A1 | 5/2017 | Saltsidis |
| 2020/0267791 | A1 | 8/2020 | Yilmaz et al. |

OTHER PUBLICATIONS

Department of Defense Interface Standard Interoperability and Performance Standards for Medium and High Frequency Radio Systems. MIL-STD-188-141D. Dec. 22, 2017. (Year: 2017).*
Interoperability and Performance Standards for Medium and High Frequency Radio Systems, Department of Defense Interface Standard, MIL-STD-188-141D, Dec. 22, 2017, (N.B., Appendix G "Wideband Automatic Link EstablishmentSystem"), 370 pages.

* cited by examiner

*Primary Examiner* — Erica Navar
(74) *Attorney, Agent, or Firm* — Suiter Swantz pc llo

(57) ABSTRACT

A first radio may be configured to utilize a wideband automatic link establishment (WALE). The first radio may be assigned a first channel bandwidth spanning a first number of sub-channels that is one of even or odd. A second radio may be assigned a second channel bandwidth spanning a second number of sub-channels that is the other of even or odd. A position of the first assigned frequency within a multiple element sub-channel vector for the first radio may be misaligned from a position of a second assigned frequency within the multiple element sub-channel vector for the second radio. The first radio may be configured to initiate a WALE link setup handshake with the second radio by sending a link setup request. The second radio may configure negotiated bands of the second radio to account for an offset of half of the sub-channel.

15 Claims, 14 Drawing Sheets

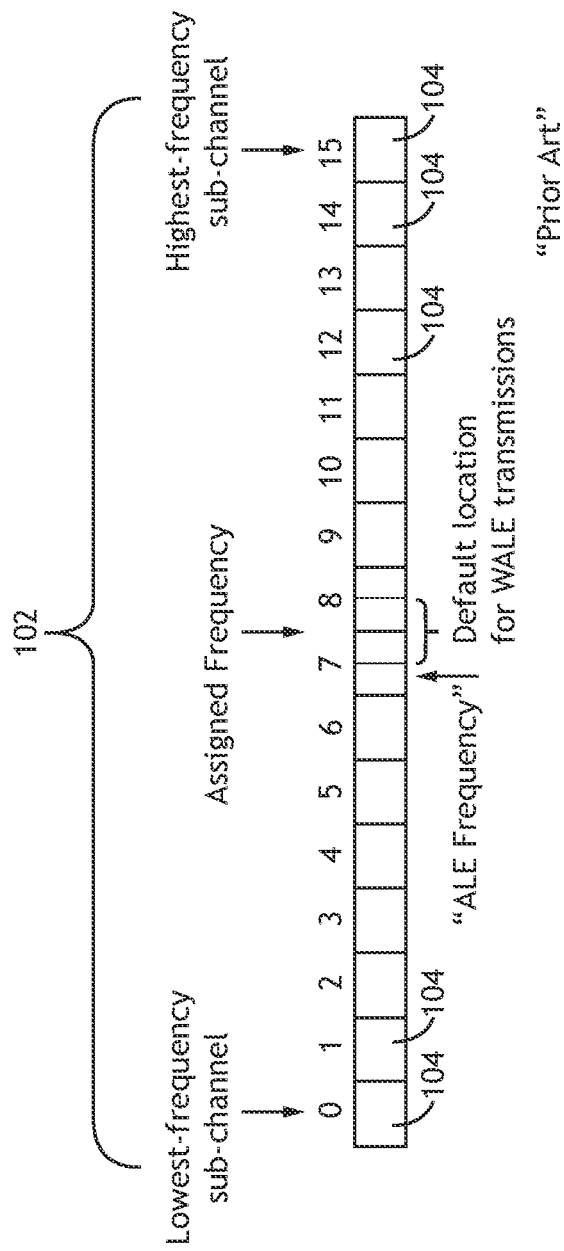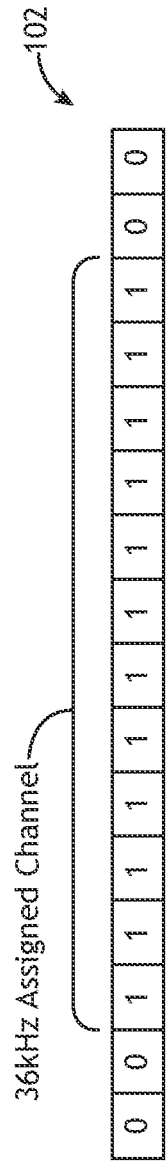

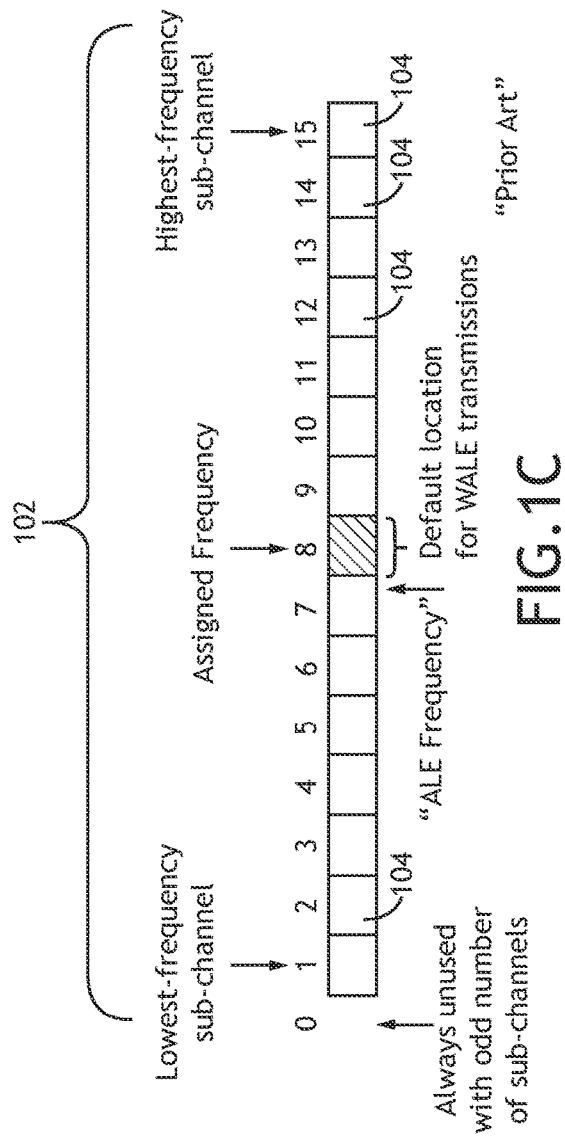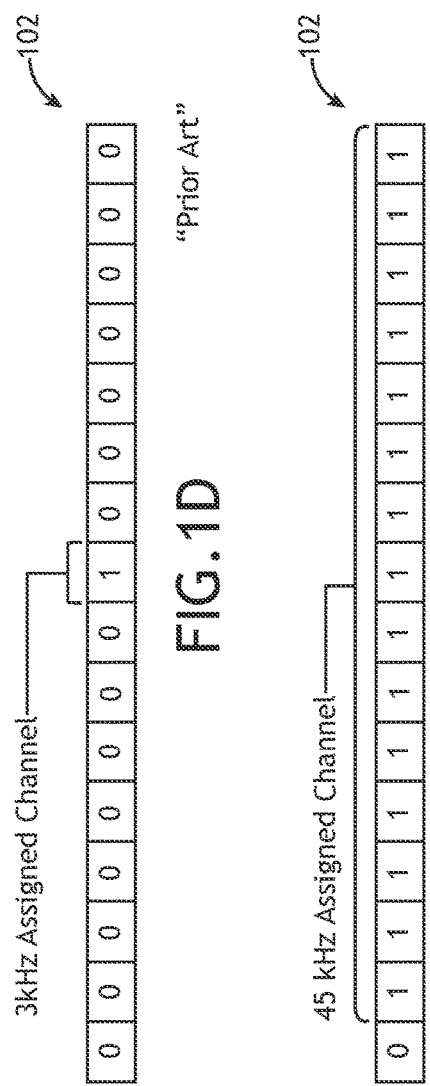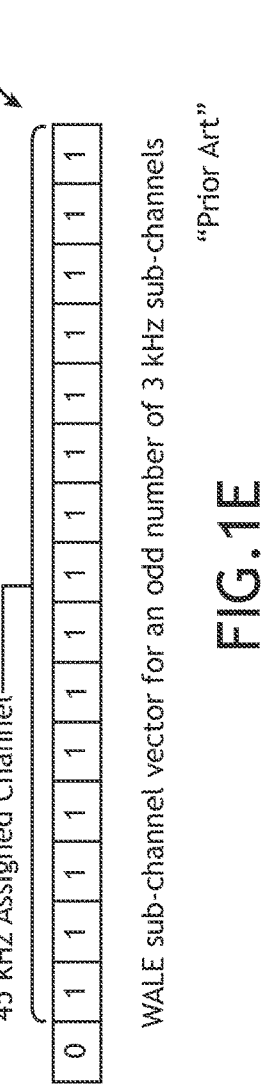
FIG. 1C "Prior Art"
FIG. 1D "Prior Art"
FIG. 1E "Prior Art"

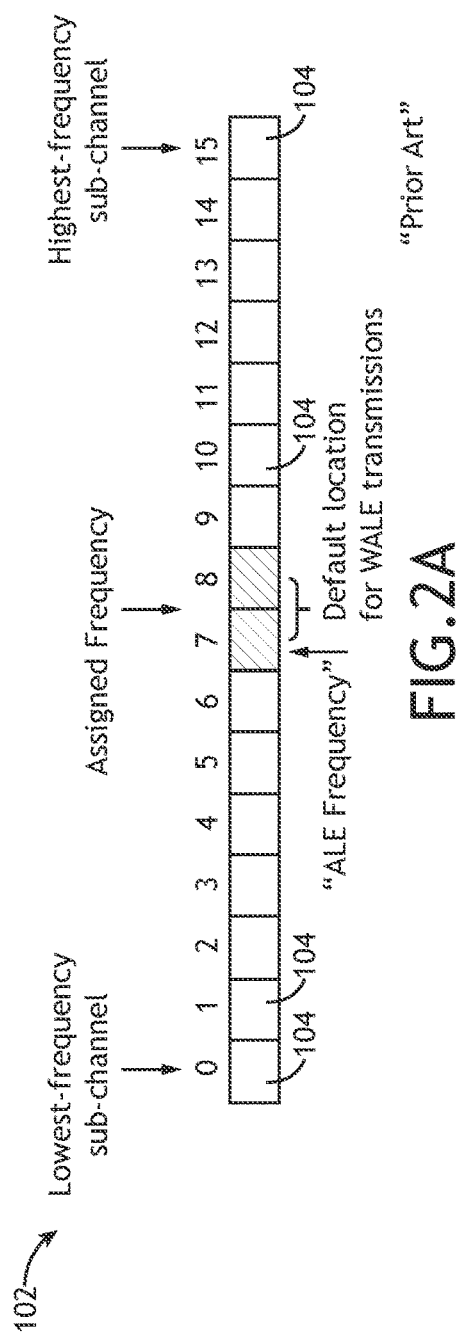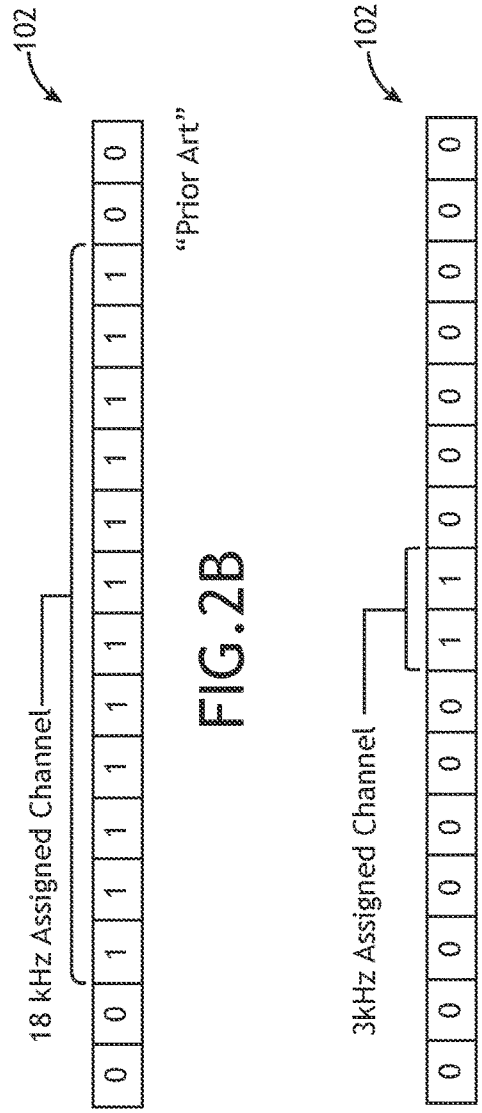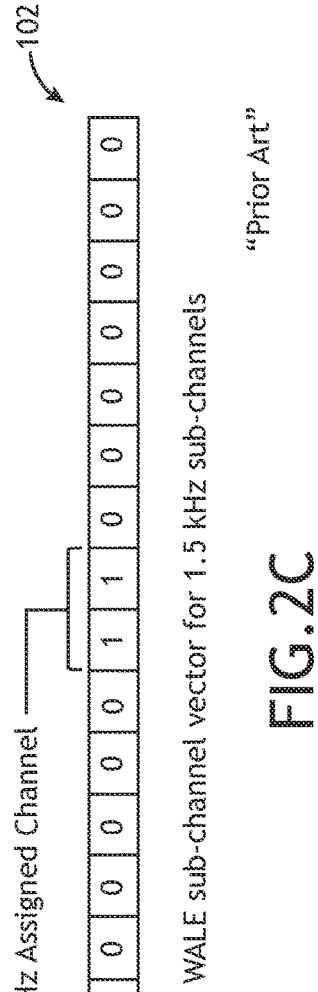

"Prior Art"

| | 7 | 6 | 5 | 4 | 3 | 2 | 1 | 0 |
|---|---|---|---|---|---|---|---|---|
| LSU_Req | 0 | 1 | 0 | 0 | 0 | 0 | V | M |
| | Traf Type | | | | | | EC | |
| Caller Address | MSB ---------------------------------- LSB | | | | | | | |
| Called Address | MSB ---------------------------------- LSB | | | | | | | |
| Assigned Sub-channels | bin 15 ---------------------------- bin 0 | | | | | | | |
| Occupied Sub-channels | bin 15 ---------------------------- bin 0 | | | | | | | |
| CRC | MSB ---------------------------------- LSB | | | | | | | |

Link Setup Request (2-way) PDU

"Prior Art"

FIG. 5A

| | 7 | 6 | 5 | 4 | 3 | 2 | 1 | 0 |
|---|---|---|---|---|---|---|---|---|
| LSU_Conf | 0 | 1 | 0 | 0 | 0 | 1 | V | M |
| | SNR | | | | | | EC | |
| Caller Address | MSB ---------- LSB | | | | | | | |
| Called Address | MSB ---------- LSB | | | | | | | |
| Tx Sub-channels | bin 15 ---------- bin 0 | | | | | | | |
| Rx Sub-channels | bin 15 ---------- bin 0 | | | | | | | |
| CRC | ---------- MSB LSB ---------- | | | | | | | |

Link Setup Confirm PDU

"Prior Art"

FIG. 5B

| 7 | 6 | 5 | 4 | 3 | 2 | 1 | 0 | |
|---|---|---|---|---|---|---|---|---|
| 0 | 1 | 0 | 1 | 1 | 1 | V | M | LSU_Status |
| Status | | | | | | EC | | |
| MSB ---------------------------------- LSB | | | | | | | | Caller Address |
| MSB ---------------------------------- LSB | | | | | | | | Count |
| 0 | 0 | 0 | 0 | 0 | 0 | 0 | 0 | (spare do not use) |
| bin 15 ---------------------------- bin 0 | | | | | | | | Assigned Sub-channels |
| 0 | 0 | 0 | 0 | 0 | 0 | 0 | 0 | (spare do not use) |
| 0 | 0 | 0 | 0 | 0 | 0 | 0 | 0 | |
| ---------------------------------- MSB | | | | | | | | CRC |
| LSB ---------------------------------- | | | | | | | | |

Sounding and Status Report PDU

*"Prior Art"*

FIG. 5C

| EC Code | Equipment Capability | Notes |
|---|---|---|
| 00 | Non-48 kHz capable | Follow Figure G-1 assuming default configurations |
| 01 | 48 kHz capable on an odd multiple of 3 kHz | Follow Figure G-2 assuming default configurations |
| 10 | 48 kHz capable on an even multiple of 3 kHz | Follow Figure G-3 assuming default configurations |
| 11 | Reserved | Customized sub-channel vector layouts (non-interoperable) |

FIG. 5D

4G ALE Link Setup Handshake

| Channel Index | Assigned Frequency (f) | ALE Frequency | Channel Bandwidth |
|---|---|---|---|
| 1 | 1956000 | 1954200 (Default) | 48kHz |
| 2 | 1956000 | 1954200 (Default) | 45kHz |

FIG. 6A

AUTOMATIC LINK ESTABLISHMENT SYSTEM AND METHOD FOR ASYMMETRIC LINK

BACKGROUND

Asymmetric links have the potential for channel misalignment using existing Wideband Automatic Link Establishment (WALE) (e.g., Fourth Generation (4G) automatic link establishment (ALE)) protocol for communications between high frequency (HF) radios. Existing 4G ALE is described in INTEROPERABILITY AND PERFORMANCE STANDARDS FOR MEDIUM AND HIGH FREQUENCY RADIO SYSTEMS, DEPARTMENT OF DEFENSE INTERFACE STANDARD, MIL-STD-188-141D, Dec. 22, 2017, (N.B., Appendix G "Wideband Automatic Link Establishment System"), all of which is incorporated herein in its entirety and hereinafter referred to as "MIL-STD-188-141D". The current 4G ALE call linking protocol of MIL-STD-188-141D implicitly requires a perfect alignment of the 16-element sub-channel vectors of both radios, but there is currently no mechanism to avoid channel misalignment.

SUMMARY

In one aspect, embodiments of the inventive concepts disclosed herein are directed to a system. The system may include a first high frequency (HF) radio and a second HF radio. The first HF radio may be configured to utilize a wideband automatic link establishment (WALE) to setup a call between the first HF radio and the second HF radio. The WALE may be used in part for managing a first channel assigned to the first HF radio and a second channel assigned to the second HF radio. Each of the first and second channel may be characterized by a multiple element sub-channel vector. Each sub-channel vector element may describe a sub-channel of one of the first or second channel. The first HF radio may be assigned a first channel bandwidth spanning a first number of sub-channels that is one of even or odd. The second HF radio may be assigned a second channel bandwidth spanning a second number of sub-channels that is the other of even or odd. The first HF radio may have a first assigned frequency based on the first number of sub-channels being the one of even or odd. The second HF radio may have a second assigned frequency based on the second number of sub-channels being the other of even or odd. A position of the first assigned frequency within the multiple element sub-channel vector for the first HF radio may be misaligned from a position of the second assigned frequency within the multiple element sub-channel vector for the second HF radio by half of a width of a sub-channel by default. The first HF radio may be configured to initiate a WALE link setup handshake with the second HF radio by sending a link setup request to the second HF radio. The link setup request may include a first equipment capability code indicative of the first HF radio having the first assigned frequency based on the first number of sub-channels being the one of even or odd. The second HF radio may be configured to: receive the link setup request; determine that the position of the first assigned frequency and the position of the second assigned frequency are misaligned by half of the width of the sub-channel by default based on the first equipment capability code; and configure negotiated transmit and receive bands of the second HF radio to account for the offset of half of the width of the sub-channel.

In a further aspect, embodiments of the inventive concepts disclosed herein are directed to a method. The method may include: utilizing, by a first high frequency (HF) radio, a wideband automatic link establishment (WALE) to setup a call between the first HF radio and a second HF radio, wherein the WALE is used in part for managing a first channel assigned to the first HF radio and a second channel assigned to the second HF radio, each of the first and second channel characterized by a multiple element sub-channel vector, each sub-channel vector element describing a sub-channel of one of the first or second channel, wherein the first HF radio is assigned a first channel bandwidth spanning a first number of sub-channels that is one of even or odd, wherein the second HF radio is assigned a second channel bandwidth spanning a second number of sub-channels that is the other of even or odd, wherein the first HF radio has a first assigned frequency based on the first number of sub-channels being the one of even or odd, wherein the second HF radio has a second assigned frequency based on the second number of sub-channels being the other of even or odd, wherein a position of the first assigned frequency within the multiple element sub-channel vector for the first HF radio is misaligned from a position of the second assigned frequency within the multiple element sub-channel vector for the second HF radio by half of a width of a sub-channel by default; initiating, by the first HF radio, an WALE link setup handshake with the second HF radio by sending a link setup request to the second HF radio, the link setup request including a first equipment capability code indicative of the first HF radio having the first assigned frequency based on the first number of sub-channels being the one of even or odd; receiving, by the second HF radio, the link setup request; determining, by the second HF radio, that the position of the first assigned frequency and the position of the second assigned frequency are misaligned by half of the width of the sub-channel by default based on the first equipment capability code; and configuring, by the second HF radio, negotiated transmit and receive bands of the second HF radio to account for an offset of half of the width of the sub-channel.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 1A, 1B, 1C, 1D, 1E, 2A, 2B, and 2C show sub-channel vectors of exemplary embodiments according to the inventive concepts disclosed herein.

FIGS. 5A, 5B, 5C, and 5D show exemplary embodiments of Link Setup Protocol Data Units (PDUs) and equipment capability (EC) codes for the HF radios of FIG. 4 according to the inventive concepts disclosed herein.

FIGS. 6A, 6B, and 6C show exemplary embodiments of an ALE link setup handshake according to the inventive concepts disclosed herein.

DETAILED DESCRIPTION

Figures 3A, 3B:
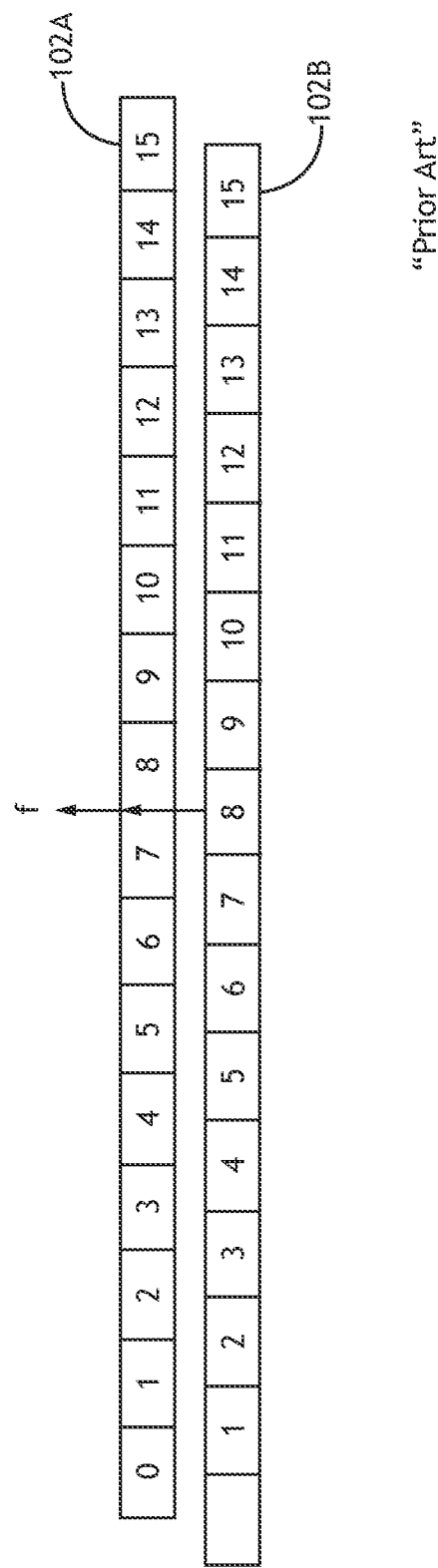
FIGS. 3A and 3B show an exemplary existing 4G ALE radio situation.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a method and a system for performing an ALE link setup handshake between two radios (e.g., HF radios).

Some embodiments include a modified version of the 4G ALE protocol that may avoid channel misalignment on asymmetric links.

Some embodiments may enhance the call setup mechanism in 4G ALE.

In some embodiments, the issue of channel misalignment for call linking in an asymmetric link may be eliminated, such that scarce HF spectrum can be better utilized.

Referring now to FIGS. 1A-2C, sub-channel vectors 102, which may be used in a modified version of the 4G ALE protocol between two HF radios to avoid channel misalignment on asymmetric links of some embodiments, are depicted according to the inventive concepts disclosed herein. FIGS. 1A-2C can be found in Appendix G of the MIL-STD-188-141D.

"WALE manages contiguous channels of up to 48 kHz. Wideband channels are described in WALE PDUs using 16-element "sub-channel" vectors. Each 1-bit element of a sub-channel vector refers to a sub-channel within an assigned wideband channel. For systems capable of using 48 kHz channels . . . , sub-channel vectors describe 3 kHz sub-channels. For all other systems, sub-channel vectors describe 1.5 kHz sub-channels." (MIL-STD-188-141D at App. G sec. G.4.2.1.2 Sub-channel vector).

Referring now to FIGS. 1A-1E, sub-channel vectors 102 for 48 kilohertz (kHz) capable radios are shown. An assigned channel for an HF radio may be characterized by a multiple (e.g., 16) element sub-channel vector 102, each sub-channel vector element 104 describing a sub-channel (e.g., a 3 kHz wide sub-channel for a 48 kHz capable radio or a 1.5 kHz wide sub-channel for a non-48 kHz capable radio (e.g., capable of less than 48 kHz)) of the channel. The HF radio may be assigned a channel bandwidth spanning a number of sub-channels that is even or odd. "A vector of 3 kHz sub-channels covers a range of 48 kHz. Element 0 [(e.g., 104)] refers to a 3 kHz sub-channel from 24 kHz to 21 kHz below the assigned frequency." (MIL-STD-188-141D at App. G sec. G.4.2.1.2.2 Sub-channel vectors for 3 kHz sub-channels).

"If the assigned channel bandwidth is an even multiple of 3 kHz (e.g., 6 kHz or 12 kHz), the assigned frequency again falls between elements 7 and 8 of the sub-channel vector as shown in [FIG. 1A]." (MIL-STD-188-141D at App. G sec. G.4.2.1.2.2 Sub-channel vectors for 3 kHz sub-channels).

FIG. 1B shows an exemplary sub-channel vector 102 having an even number of sub-channel vector elements for an even number of 3 kHz sub-channels.

"[I]f the assigned channel bandwidth is an odd multiple of 3 kHz (e.g., 3 kHz or 9 kHz), the assigned frequency shall fall in the center of sub-channel 8 and sub-channel 0 shall be unused, as shown in [FIG. 1C]." (MIL-STD-188-141D at App. G sec. G.4.2.1.2.2 Sub-channel vectors for 3 kHz sub-channels).

FIGS. 1D and 1E show exemplary sub-channel vectors 102 having an odd number of sub-channel vector elements for an odd number of 3 kHz sub-channels.

Referring now to FIGS. 2A, 2B, and 2C, sub-channel vectors 102 for non-48 kHz capable radios (e.g., capable of less than 48 kHz, such as 24 kHz) are shown. An assigned channel for an HF radio may be characterized by a multiple (e.g., 16) element sub-channel vector 102, each sub-channel vector element 104 describing a sub-channel (e.g., a 1.5 kHz wide sub-channel for a non-48 kHz capable radio) of the channel. The assigned frequency may fall between vector elements 7 and 8 of the sub-channel vector 102 as shown in FIG. 2A.

The HF radio may be assigned a channel bandwidth spanning a number of 1.5 kHz sub-channels that is even, as shown in FIGS. 2B and 2C.

Referring now to FIGS. 3A and 3B, shows an exemplary existing 4G ALE situation with Radio A (a 48 kHz capable radio) having an even number of 3 kHz sub-channel represented by the sub-channel vector 102A and Radio B (a 48 kHz capable radio) having an odd number of 3 kHz sub-channel represented by the sub-channel vector 102B. Radios A and B may be linked, but the transmission and reception bands are misaligned.

Asymmetric links have the potential for channel misalignment as shown in FIG. 3B, where the assigned frequency for Radio A is between elements 7 and 8 and the assigned frequency for Radio B is in the middle of element 8, which results in sub-channel misalignment. For example, 48 kHz-capable radios may determine the transmission/reception bands incorrectly in situations where one radio is allocated to an even multiple of 3 kHz channels while the other is allocated to an odd multiple of 3 kHz channels. The current 4G ALE call linking protocol implicitly requires a perfect alignment of the 16-element sub-channel vectors of both radios, but there is currently no mechanism to avoid channel misalignment. For example, the transmit (Tx)/receive (Rx) band for Radio A is [f−21000, f+24000], and the Tx/Rx band for Radio B is [f−22500, f+22500], where f=1956000. The outcome is that both Radio A and Radio B will link an ALE call but the radios are not aware of the fact that the negotiated Tx/Rx bands will be misaligned, where there is an offset of 1500 Hz. Due to the channel misalignment, the two radios likely will not be able to transfer data effectively (e.g., error-free) using the negotiated waveform over the misaligned Tx/Rx bands, thereby resulting in poor utilization of HF channels.

Figure 4:
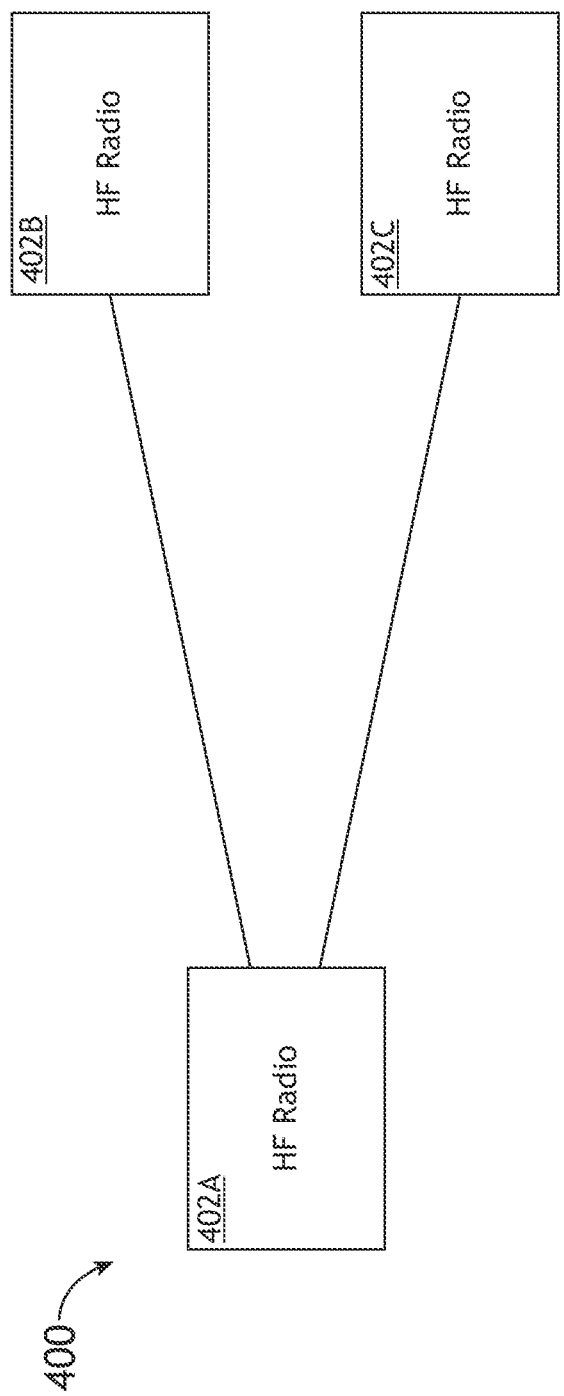
FIG. 4 is a view of an exemplary system including HF radios of an exemplary embodiment according to the inventive concepts disclosed herein.

Referring now to FIG. 4, an exemplary embodiment of a system 400 according to the inventive concepts disclosed herein is depicted. The system 400 may be implemented as any suitable system, such as a network. The system 400 may include multiple radios (e.g., HF radios 402A, 402B, 402C), some or all of which may be communicatively coupled at any given time.

Each of the HF radios 402A, 402B, 402C may use sub-channel vectors 102 as shown in and described with respect to FIGS. 1A, 1B, 1C, 1D, 1E, 2A, 2B, and/or 2C. Each of the HF radios 402A, 402B, 402C may be capable of transmitting and/or receiving data. Each of the HF radios 402A, 402B, 402C may include any number and/or combination of transmitters, receivers, transceivers, processors, memory radios, modems, and/or antennas, some or all of which may be communicatively coupled at any given time. For example, at least one processor may include may be configured to perform (e.g., collectively perform) or cause (e.g., collectively cause) to be performed any of the operations disclosed throughout. The processor may be configured to run various software applications or computer code stored (e.g., maintained) in a non-transitory computer-readable medium (e.g., memory and/or storage) and configured to execute various instructions or operations.

For example, HF radios 402A, 402B may be 48 kilohertz (kHz) capable. For example, HF radio 402C may be non-48 kilohertz (kHz) capable or may have customized sub-channel vector layouts.

Some embodiments may retain the existing layouts of sub-channel vectors (from MIL-STD-188-141D at App. G) unchanged, but include the following modifications: information of whether an assigned channel is an odd or even multiple of 3 kHz; and/or information of a default ALE channel is used.

Referring now to FIGS. 5A, 5B, 5C, and 5D, exemplary embodiments showing Link Setup Protocol Data Units (PDUs) and equipment capability (EC) codes for the HF radios 402A, 402B, 402C according to the inventive concepts disclosed herein are depicted.

As shown in FIG. 5D, in some embodiments, an existing 2-bit equipment capability (EC) field of Link Setup Protocol Data Units (PDUs) may be modified to use the following four EC codes: One code (e.g., 00) for a non-48 kHz capable system assuming default configurations; One code (e.g., 01) for a 48 kHz capable on an odd multiple of 3 kHz channel assuming default configurations; One code (e.g., 10) for a 48 kHz capable on an even multiple of 3 kHz channel assuming default configurations; and One code (e.g., 11) reserved for a system that uses customized configurations. These four EC codes of some embodiments are materially different than the codes used in MIL-STD-188-141D. Each equipment capability code may be a two-bit value.

In some embodiments, the EC codes of FIG. 5D may be included in the Link Setup Request PDU of FIG. 5A, the Link Setup Confirmation PDU of FIG. 5B, and the second Link Setup Confirmation PDU (e.g., the Sounding and Status Report PDU) of FIG. 5C.

In some embodiments, radios 402A, 402B, 402C that detect an asymmetric link during an ALE link setup handshake can decide whether 1) to accept a link request and adjust its Tx/Rx offsets accordingly, or 2) reject the call request.

Figure 6B:
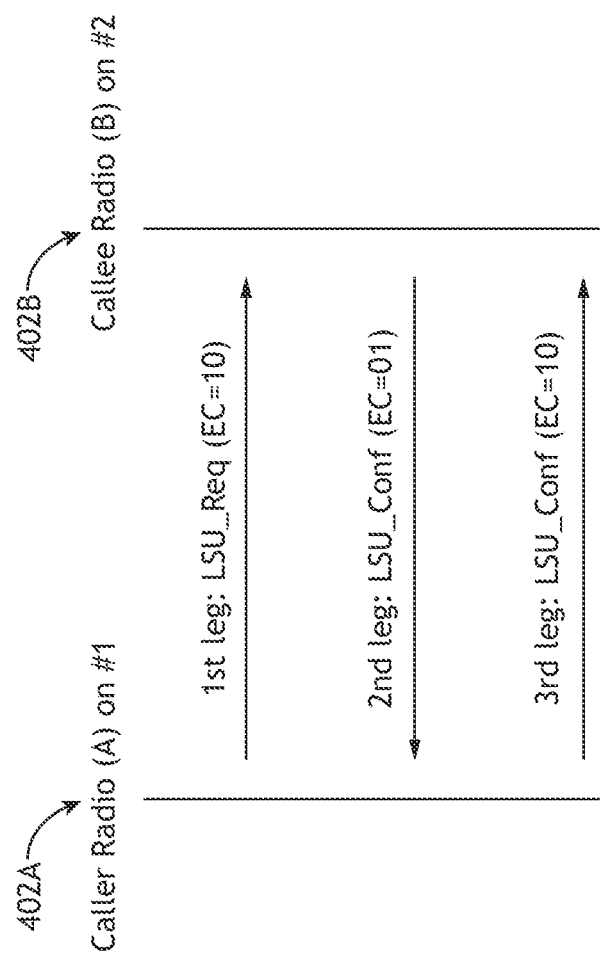
Figure 6C:
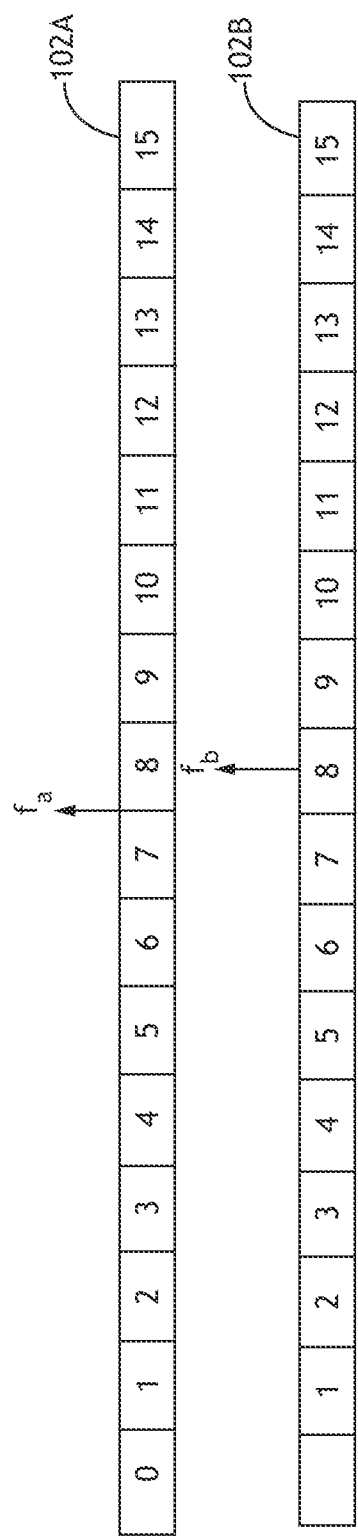

Referring now to FIGS. 6A-6C, exemplary embodiments of an ALE link setup handshake (e.g., a two-way ALE link setup handshake (e.g., a two-way fourth generation (4G) WALE link setup handshake) or a three-way ALE link setup handshake (e.g., a three-way 4G WALE link setup handshake)) between the first HF radio 402A and the second HF radio 402B are shown.

As shown in FIG. 6A, the first HF radio 402A radio may be on channel #1 with an even number of 3 kHz sub-channels, and the second HF radio 402B radio may be on channel #2 with an odd number of 3 kHz sub-channels.

As shown in FIG. 6B, the first HF radio 402A may be the caller radio, and the second HF radio 402B may be the callee radio. An exemplary three-way fourth generation (4G) WALE link setup handshake follows:

First, the Caller Radio (402A) may transmit a Link Setup (LSU) Request (Req) PDU with EC set to '10' to Callee Radio (402B) in the 1st leg.

Second, the Callee Radio (402B) may receive and decode the LSU_Req PDU and may be now aware that Caller Radio (402A) is assigned to a channel that is an even multiple of 3 kHz. Callee Radio (402B) may evaluate its Tx and Rx available bands by taking the 1500 Hz offset into account. Callee Radio (402B) may then respond back with an LSU Confirmation (LSU_Conf) PDU with EC set to '01' to Caller Radio (402A) in the $2^{nd}$ leg.

Third, the Caller Radio (402A) may receive and decode the LSU_Conf PDU and is now aware that Callee Radio (402B) is assigned to a channel that is an odd multiple of 3 kHz. Caller Radio (402A) finalizes and configures its negotiated Tx and Rx bands by taking the 1500 Hz offset into account. Caller Radio (402A) then responds back with an LSU_Conf PDU with EC set to '10' to Callee Radio (402B) in the 3rd leg.

Fourth, the Callee Radio (402B) receives and decodes the LSU_Conf PDU, and then configures its Tx and Rx bands based on the Tx and Rx sub-channel vectors 102 from the received LSU_Conf PDU.

FIG. 6C shows an example of the sub-channel vectors 102 being aligned, as a result of the Callee Radio (402B) configuring the negotiated transmit and receive bands of the Callee Radio (402B) to account for the offset of half of the width of the sub-channel.

In another example, the first HF radio 402A may be configured to utilize a wideband automatic link establishment (WALE) to setup a call between the first HF radio 402A and the second HF radio 402B. The WALE may be used in part for managing a first channel assigned to the first HF radio 402A and a second channel assigned to the second HF radio 402B. Each of the first and second channel may be characterized by a multiple element sub-channel vector 102. Each sub-channel vector element 104 may describe a sub-channel of one of the first or second channel. The first HF radio 402A may be assigned a first channel bandwidth spanning a first number of sub-channels that is one of even or odd. The second HF radio 402B may be assigned a second channel bandwidth spanning a second number of sub-channels that is the other of even or odd. The first HF radio 402A may have a first assigned frequency based on the first number of sub-channels being the one of even or odd, and the second HF radio 402B may have a second assigned frequency based on the second number of sub-channels being the other of even or odd. A position of the first assigned frequency within the multiple element sub-channel vector 102 for the first HF radio 402 may be misaligned from a position of the second assigned frequency within the multiple element sub-channel vector 102 for the second HF radio 402 by half of a width of a sub-channel by default.

Still referring to the same example, the first HF radio 402A may be configured to initiate a WALE link setup handshake (e.g., a two-way WALE link setup handshake (e.g., a two-way fourth generation (4G) WALE link setup handshake) or a three-way WALE link setup handshake (e.g., a three-way 4G WALE link setup handshake)) with the second HF radio 402B by sending a link setup request to the second HF radio 402B. The link setup request may include a first equipment capability code indicative of the first HF radio 402A having the first assigned frequency based on the first number of sub-channels being the one of even or odd.

Still referring to the same example, the second HF radio 402B may be configured to: receive the link setup request; determine that the position of the first assigned frequency and the position of the second assigned frequency are misaligned by half of the width of the sub-channel by default based on the first equipment capability code; evaluate available transmit and receive bands of the second HF radio 402B by accounting for an offset of half of the width of the sub-channel; and/or send a first link setup confirmation to the first HF radio 402A, the first link setup confirmation including a second equipment capability code indicative of the second HF radio 402B having the second assigned frequency based on the second number of sub-channels being the other of even or odd.

Still referring to the same example, the first HF radio 402A may be further configured to: receive the first link setup confirmation; determine that the position of the first assigned frequency and the position of the second assigned frequency are misaligned by half of the width of the sub-channel by default based on the second equipment capability code; evaluate negotiated transmit and receive bands of the first HF radio 402A by accounting for the offset of half of the width of the sub-channel; and/or send a second link setup confirmation to the second HF radio 402B, the second link setup confirmation including the first equipment capability code.

Still referring to the same example, the second HF radio 402B may be further configured to: receive the second link setup confirmation; and/or in response to receipt of the second link setup confirmation, configure the negotiated transmit and receive bands of the second HF radio 402B to account for the offset of half of the width of the sub-channel.

Additionally, for example, the first HF radio 402A may have the first number of sub-channels that is even, and the second HF radio 402B may have the second number of sub-channels that is odd. Alternatively, for example, the first HF radio 402A may have the first number of sub-channels that is odd, and the second HF radio 402B may have the second number of sub-channels that is even.

In some embodiments, the first HF radio 402A may be configured to initiate an ALE link setup handshake with the third HF radio 402C, wherein the third HF radio 402C may communicate a third equipment capability code indicative of the third HF radio 402C being non-48 kilohertz (kHz) capable.

In some embodiments, the first HF radio 402A may be configured to initiate an ALE link setup handshake with the third HF radio 402C, wherein the third HF radio 402C may communicate a third equipment capability code indicative of the third HF radio 402C having customized sub-channel vector layouts.

In some embodiments, the first HF radio 402A may be configured to initiate a two-way WALE link setup handshake (e.g., a two-way fourth generation (4G) WALE link setup handshake). The two-way WALE link setup handshake may be similar to the three-way WALE link setup handshake, except that the two-way WALE link setup handshake may omit the step of the Caller Radio (402A) responding back with an LSU_Conf PDU with EC set to '10' to Callee Radio (402B) in the 3rd leg. For example, for the two-way WALE link setup handshake, the Caller Radio (402A) may be on an even 48 kHz channel, and a Callee Radio (402B) may be on an odd 45 kHz channel (or vice versa in other embodiments). The two-way WALE link setup handshake may include: (1) Caller Radio (402A) transmits an LSU_Req PDU with EC set to '10' to Callee Radio (402B) in the 1st leg; (2) Callee Radio (402B) receives and decodes the LSU_Req PDU and is now aware that Caller Radio (402A) is assigned to a channel that is an even multiple of 3 kHz. Callee Radio (402B) evaluates its Tx and Rx available bands by taking the 1500 Hz offset into account. Callee Radio (402B) finalizes and configures its negotiated Tx and Rx bands by taking the 1500 Hz offset into account, and then responds back with an LSU_Conf PDU with EC set to '01' to Caller Radio (402A) in the 2nd leg; and (3) Caller Radio (402A) receives and decodes the LSU_Conf PDU, and then configures its Tx and Rx bands based on the Tx and Rx sub-channel vectors from the received LSU_Conf PDU.

Figure 7:
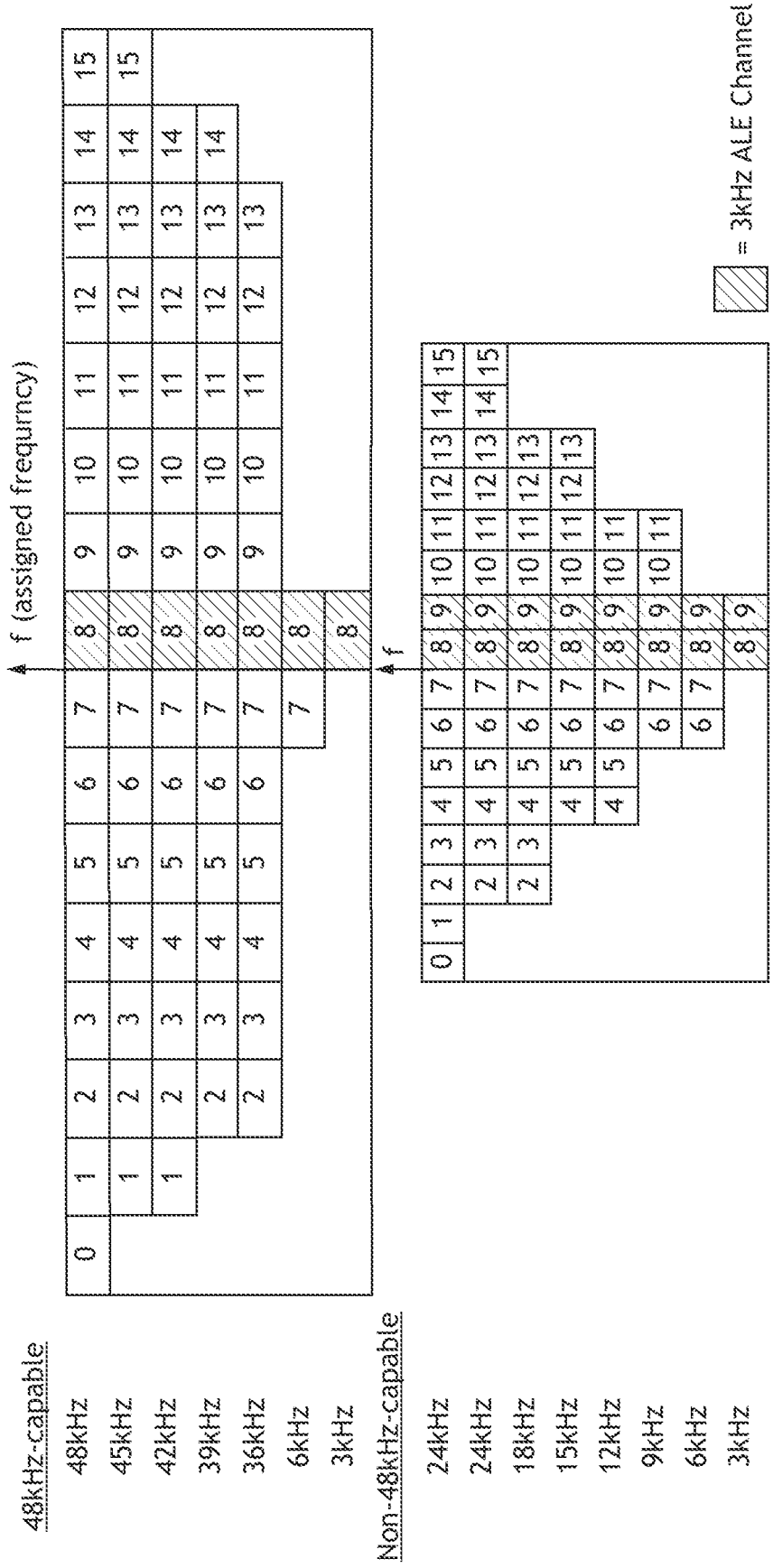
FIG. 7 shows an alternative embodiment that may avoid channel misalignment on asymmetric links according to the inventive concepts disclosed herein.

Referring now to FIG. 7, an alternative embodiment that may avoid channel misalignment on asymmetric links according to the inventive concepts disclosed herein is depicted. As shown in FIG. 7, channel misalignment on asymmetric links may be avoided by positioning all assigned frequencies between vector element 7 (e.g., 104) and vector element 8 (e.g., 104) for 48 kHz capable HF radios (e.g., 402A, 402B) and non-48 kHz capable radios (e.g., 402C). That is, the assigned frequency (f) may always be centered at the 16-element interference/sub-channel vector (e.g., 102). This means that the assigned frequency may always fall between element-7 and element-8 regardless of channel bandwidths or waveform capabilities. This embodiment, however, would change the definition of an "assigned frequency", on which an allocated channel band is centered.

For example, a default ALE frequency may be f minus 300 in upper sideband (USB). For 3 kHz wide elements, default ALE channel location may be at vector element 8, and this configuration may be for 48 kHz capable radios. For 1.5 kHz wide elements, default ALE channel location may be between vector element 8 and vector element 9, and this configuration may be for non-48 kHz capable radios. It should be noted that a 4G ALE signal is 3 kHz wide.

Figure 8:
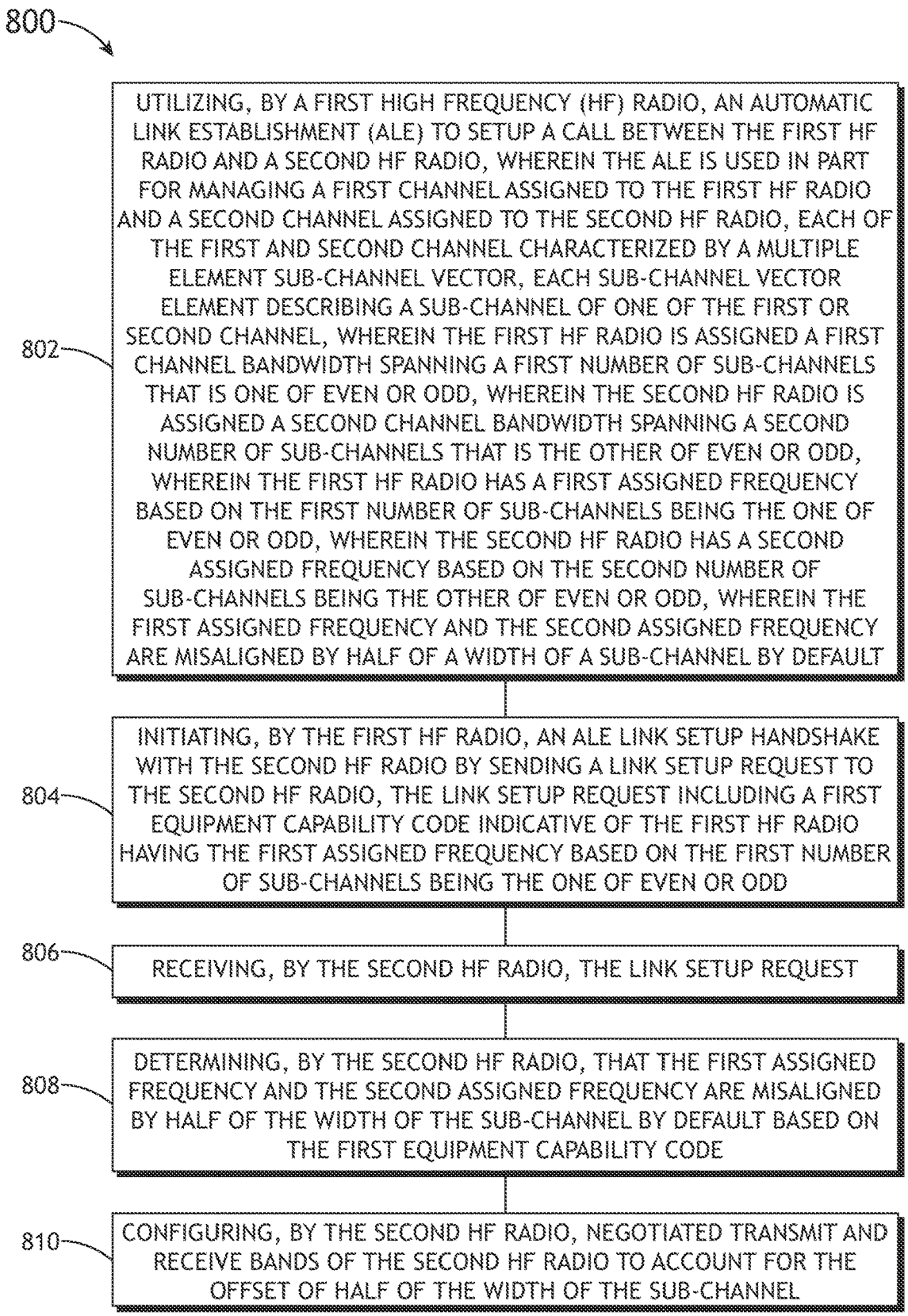
FIG. 8 is a diagram of an exemplary embodiment of a method according to the inventive concepts disclosed herein.

Referring now to FIG. 8, an exemplary embodiment of a method 800 according to the inventive concepts disclosed herein may include one or more of the following steps. Additionally, for example, some embodiments may include performing one more instances of the method 800 iteratively, concurrently, and/or sequentially. Additionally, for example, at least some of the steps of the method 800 may be performed in parallel and/or concurrently. Additionally, in some embodiments, at least some of the steps of the method 800 may be performed non-sequentially.

A step 802 may include utilizing, by a first high frequency (HF) radio, an automatic link establishment (ALE) (e.g., a wideband ALE (WALE)) to setup a call between the first HF radio and a second HF radio, wherein the ALE is used in part for managing a first channel assigned to the first HF radio and a second channel assigned to the second HF radio, each of the first and second channel characterized by a multiple element sub-channel vector, each sub-channel vector element describing a sub-channel of one of the first or second channel, wherein the first HF radio is assigned a first channel bandwidth spanning a first number of sub-channels that is one of even or odd, wherein the second HF radio is assigned a second channel bandwidth spanning a second number of sub-channels that is the other of even or odd, wherein the first HF radio has a first assigned frequency based on the first number of sub-channels being the one of even or odd, wherein the second HF radio has a second assigned frequency based on the second number of sub-channels being the other of even or odd, wherein a position of the first assigned frequency within the multiple element sub-channel vector for the first HF radio is misaligned from a position of the second assigned frequency within the multiple element sub-channel vector for the second HF radio by half of a width of a sub-channel by default.

A step 804 may include initiating, by the first HF radio, an ALE link setup handshake (e.g., a WALE link setup handshake) with the second HF radio by sending a link setup request to the second HF radio, the link setup request including a first equipment capability code indicative of the first HF radio having the first assigned frequency based on the first number of sub-channels being the one of even or odd.

A step 806 may include receiving, by the second HF radio, the link setup request.

A step 808 may include determining, by the second HF radio, that the position of the first assigned frequency and the position of the second assigned frequency are misaligned by half of the width of the sub-channel by default based on the first equipment capability code.

A step 810 may include configuring, by the second HF radio, negotiated transmit and receive bands of the second HF radio to account for the offset of half of the width of the sub-channel.

Further, the method 800 may include any of the operations disclosed throughout.

As will be appreciated from the above, embodiments of the inventive concepts disclosed herein may be directed to a method and a system for performing an ALE link setup handshake between two radios (e.g., HF radios).

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a first high frequency (HF) radio; and
a second HF radio;
wherein the first HF radio is configured to utilize a wideband automatic link establishment (WALE) to setup a call between the first HF radio and the second HF radio, wherein the WALE is used in part for managing a first channel assigned to the first HF radio and a second channel assigned to the second HF radio, each of the first and second channel characterized by a multiple element sub-channel vector, each sub-channel vector element describing a sub-channel of one of the first or second channel, wherein the first HF radio is assigned a first channel bandwidth spanning a first number of sub-channels that is one of even or odd, wherein the second HF radio is assigned a second channel bandwidth spanning a second number of sub-channels that is the other of even or odd, wherein the first HF radio has a first assigned frequency based on the first number of sub-channels being the one of even or odd, wherein the second HF radio has a second assigned frequency based on the second number of sub-channels being the other of even or odd, wherein a position of the first assigned frequency within the multiple element sub-channel vector for the first HF radio is misaligned from a position of the second assigned frequency within the multiple element sub-channel vector for the second HF radio by half of a width of a sub-channel by default;
wherein the first HF radio is configured to initiate a WALE link setup handshake with the second HF radio by sending a link setup request to the second HF radio, the link setup request including a first equipment capability code indicative of the first HF radio having the first assigned frequency based on the first number of sub-channels being the one of even or odd; and
wherein the second HF radio is configured to: receive the link setup request; determine that the position of the first assigned frequency and the position of the second assigned frequency are misaligned by half of the width of the sub-channel by default based on the first equipment capability code; and configure negotiated transmit and receive bands of the second HF radio to account for an offset of half of the width of the sub-channel.

2. The system of claim 1, wherein the WALE link setup handshake is a two-way WALE link setup handshake or a three-way WALE link setup handshake.

3. The system of claim 2, wherein the WALE link setup handshake is a two-way fourth generation (4G) WALE link setup handshake or is a three-way 4G WALE link setup handshake.

4. The system of claim 2, wherein the WALE link setup handshake is the three-way WALE link setup handshake,
wherein the second HF radio is further configured to: evaluate available transmit and receive bands of the second HF radio by accounting for the offset of half of the width of the sub-channel; and send a first link setup confirmation to the first HF radio, the first link setup confirmation including a second equipment capability code indicative of the second HF radio having the second assigned frequency based on the second number of sub-channels being the other of even or odd;
wherein the first HF radio is further configured to: receive the first link setup confirmation; determine that the position of the first assigned frequency and the position of the second assigned frequency are misaligned by half of the width of the sub-channel by default based on the second equipment capability code; evaluate negotiated transmit and receive bands of the first HF radio by accounting for the offset of half of the width of the sub-channel; and send a second link setup confirmation to the second HF radio, the second link setup confirmation including the first equipment capability code;
wherein the second HF radio is further configured to: receive the second link setup confirmation; and in response to receipt of the second link setup confirmation, configure the negotiated transmit and receive bands of the second HF radio to account for the offset of half of the width of the sub-channel.

5. The system of claim 1, wherein the first HF radio and the second HF radio are 48 kilohertz (kHz) capable.

6. The system of claim 5, wherein a width of a sub-channel is 3 kHz, wherein the multiple element sub-channel vector has 16 sub-channel vector elements.

7. The system of claim 6, wherein each equipment capability code is a two-bit value.

8. The system of claim 7, wherein the first HF radio has the first number of sub-channels that is even, wherein the second HF radio has the second number of sub-channels that is odd.

9. The system of claim 7, wherein the first HF radio has the first number of sub-channels that is odd, wherein the second HF radio has the second number of sub-channels that is even.

10. The system of claim 1, further comprising a third HF radio, wherein the first HF radio is configured to initiate a WALE link setup handshake with the third HF radio, the third HF radio communicating a third equipment capability code indicative of the third HF radio being non-48 kilohertz (kHz) capable.

11. The system of claim 1, further comprising a third HF radio, wherein the first HF radio is configured to initiate a WALE link setup handshake with the third HF radio, the third HF radio communicating a third equipment capability code indicative of the third HF radio having customized sub-channel vector layouts.

12. A method, comprising:
utilizing, by a first high frequency (HF) radio, a wideband automatic link establishment (WALE) to setup a call between the first HF radio and a second HF radio, wherein the WALE is used in part for managing a first channel assigned to the first HF radio and a second channel assigned to the second HF radio, each of the first and second channel characterized by a multiple element sub-channel vector, each sub-channel vector element describing a sub-channel of one of the first or second channel, wherein the first HF radio is assigned a first channel bandwidth spanning a first number of sub-channels that is one of even or odd, wherein the second HF radio is assigned a second channel bandwidth spanning a second number of sub-channels that is the other of even or odd, wherein the first HF radio has a first assigned frequency based on the first number of sub-channels being the one of even or odd, wherein the second HF radio has a second assigned frequency based on the second number of sub-channels being the other of even or odd, wherein a position of the first assigned frequency within the multiple element sub-channel vector for the first HF radio is misaligned from a position of the second assigned frequency within the multiple element sub-channel vector for the second HF radio by half of a width of a sub-channel by default;

initiating, by the first HF radio, a WALE link setup handshake with the second HF radio by sending a link setup request to the second HF radio, the link setup request including a first equipment capability code indicative of the first HF radio having the first assigned frequency based on the first number of sub-channels being the one of even or odd;

receiving, by the second HF radio, the link setup request;

determining, by the second HF radio, that the position of the first assigned frequency and the position of the second assigned frequency are misaligned by half of the width of the sub-channel by default based on the first equipment capability code; and configuring, by the second HF radio, negotiated transmit and receive bands of the second HF radio to account for an offset of half of the width of the sub-channel.

13. The method of claim 12, wherein the WALE link setup handshake is a two-way WALE link setup handshake or a three-way WALE link setup handshake.

14. The method of claim 13, wherein the WALE link setup handshake is a two-way fourth generation (4G) WALE link setup handshake or is a three-way 4G WALE link setup handshake.

15. The method of claim 12, wherein the first HF radio and the second HF radio are 48 kilohertz (kHz) capable.

* * * * *